United States Patent
Kim et al.

(10) Patent No.: US 10,990,802 B2
(45) Date of Patent: Apr. 27, 2021

(54) IMAGING APPARATUS PROVIDING OUT FOCUSING AND METHOD FOR CONTROLLING THE SAME

(71) Applicant: Samsung Electronics Co., Ltd., Suwon-si (KR)

(72) Inventors: Sun-jung Kim, Suwon-si (KR); Beom-su Kim, Seoul (KR); Hong-il Kim, Yongin-si (KR); Tae-hwa Hong, Seoul (KR); Joo-young Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 363 days.

(21) Appl. No.: 15/290,640

(22) Filed: Oct. 11, 2016

(65) Prior Publication Data

US 2017/0104920 A1    Apr. 13, 2017

(30) Foreign Application Priority Data

Oct. 13, 2015 (KR) .................. 10-2015-0142632

(51) Int. Cl.
*G06K 9/00* (2006.01)
*G06T 7/194* (2017.01)
(Continued)

(52) U.S. Cl.
CPC ..... *G06K 9/00228* (2013.01); *G06K 9/00268* (2013.01); *G06K 9/32* (2013.01); *G06K 9/52* (2013.01); *G06K 9/6224* (2013.01); *G06K 9/66* (2013.01); *G06K 9/78* (2013.01); *G06T 7/162* (2017.01); *G06T 7/194* (2017.01); *G06T 7/20* (2013.01); *G06T 7/215* (2017.01);
(Continued)

(58) Field of Classification Search
CPC .......... G06T 7/194; G06T 7/20; G06T 7/215; H04N 5/2226; H04N 5/272; H04N 5/23254
USPC .................. 348/349, 402.1, 413.1, 356, 586
See application file for complete search history.

(56) References Cited

U.S. PATENT DOCUMENTS 7,227,893 B1 *   6/2007   Srinivasa ........... G06K 9/00771
                                                            348/155
7,660,463 B2    2/2010   Blake et al.
(Continued)

FOREIGN PATENT DOCUMENTS

KR    10-1214536 B1    1/2013

OTHER PUBLICATIONS

Google. Project tango. (www.google.com/atap/projecttango).
(Continued)

*Primary Examiner* — Yosef K Laekemariam
(74) *Attorney, Agent, or Firm* — Jefferson IP Law, LLP

(57) ABSTRACT

An imaging apparatus and a control method thereof are provided. The method for controlling the imaging apparatus includes acquiring images having a same focal length by performing continuous imaging in a predetermined time when a user's imaging command is input, calculating motion vectors using the images and separating a foreground and a background of a first image among the images based on the calculated motion vectors and color information of the first image, and performing out focusing based on the separated foreground and the separated background.

16 Claims, 9 Drawing Sheets
(6 of 9 Drawing Sheet(s) Filed in Color)

(51) Int. Cl.
| | |
|---|---|
| *G06T 7/215* | (2017.01) |
| *G06K 9/62* | (2006.01) |
| *G06K 9/78* | (2006.01) |
| *G06T 7/162* | (2017.01) |
| *G06K 9/32* | (2006.01) |
| *G06K 9/52* | (2006.01) |
| *G06K 9/66* | (2006.01) |
| *G06T 7/20* | (2017.01) |
| *H04N 5/232* | (2006.01) |
| *G06K 9/46* | (2006.01) |

(52) U.S. Cl.
CPC ....... *H04N 5/23212* (2013.01); *G06K 9/4652* (2013.01); *G06T 2207/10024* (2013.01); *G06T 2207/20036* (2013.01); *G06T 2207/20076* (2013.01); *G06T 2207/30196* (2013.01); *G06T 2207/30201* (2013.01)

(56) References Cited

U.S. PATENT DOCUMENTS

| | | | |
|---|---|---|---|
| 8,638,993 B2 | 1/2014 | Lee et al. | |
| 8,655,093 B2 | 2/2014 | El Dokor et al. | |
| 8,818,097 B2 | 8/2014 | Wernersson et al. | |
| 8,958,655 B2 | 2/2015 | Ueda et al. | |
| 9,247,129 B1* | 1/2016 | Gray | G06T 7/11 |
| 2009/0213234 A1* | 8/2009 | Chen | H04N 5/23248 348/208.4 |
| 2010/0111370 A1* | 5/2010 | Black | G06K 9/00369 382/111 |
| 2010/0266207 A1* | 10/2010 | Zhang | H04N 5/262 382/195 |
| 2010/0329549 A1* | 12/2010 | Steinberg | G06K 9/38 382/164 |
| 2011/0150337 A1* | 6/2011 | Lai | G06T 7/194 382/190 |
| 2011/0169921 A1 | 7/2011 | Lee et al. | |
| 2011/0187900 A1* | 8/2011 | Park | G06K 9/00 348/239 |
| 2014/0003719 A1* | 1/2014 | Bai | G06T 7/269 382/173 |
| 2014/0152862 A1* | 6/2014 | Takagi | H04N 5/23254 348/222.1 |
| 2014/0267618 A1 | 9/2014 | Esteban et al. | |
| 2015/0003676 A1* | 1/2015 | Kuchiki | G06T 7/254 382/103 |

OTHER PUBLICATIONS

Rother, C. et al. "GrabCut"—Interactive Foreground Extraction using Iterated Graph Cuts. ACM Transactions on Graphics, 309-314 (2004).

Bruhn, A. & Weickert, J. Lucas/Kanade meets Horn/Schunck: Combinning local and global optic flow methods. IJCV 61(3), 211-231 (2005).

Liu, M. Y. et al. Entropy Rate Superpixel Segmentation. CVPR, 2097-2104 (2011).

Julian, P. el al. Automatic Hair Detection in the Wild. ICPR (2010).

Scheffler, C. & Odobez, J. M. Joint Adaptive Colour Modelling And Skin, Hair And Clothing Segmentation Using Coherent Probabilistic Index Maps. BMVC (2011).

Yu, F. & Callup, D. 3D Reconstruction from Accidental Motion. CVPR, 3986-3993 (2014).

Joshi, N. & Zitnick, C. L. Micro-baseline stereo. Technical report MSR-TR-2014-73. Microsoft Research (2014).

Barron, J. T. et al. Fast Bilateral-Space Stereo for Synthetic Defocus. CVPR (2015).

Venkataraman, K. et al. PiCam: An Ultra-Thin High Performance Monolithic Camera Array. SIGGRAPH Asia (2013).

* cited by examiner

IMAGING APPARATUS PROVIDING OUT FOCUSING AND METHOD FOR CONTROLLING THE SAME

CROSS-REFERENCE TO RELATED APPLICATION(S)

This application claims the benefit under 35 U.S.C. § 119(a) of a Korean patent application filed on Oct. 13, 2015 in the Korean Intellectual Property Office and assigned Ser. No. 10-2015-0142632, the entire disclosure of which is hereby incorporated by reference.

TECHNICAL FIELD

The present disclosure relates to an imaging apparatus and a method for controlling the same. In particular, the present disclosure relates to an imaging apparatus that performs out focusing using motion vectors and color information of a plurality of images that are continuously captured, and a method for controlling the same.

BACKGROUND

Recently, images can be captured using not only general digital cameras but also various electronic devices, such as smart phones. In particular, an imaging apparatus including a camera provides various effects, such as out focusing.

On the other hand, various methods for providing out focusing have been developed recently, including a method for extracting depth information using a special device, such as a depth sensor or a stereo camera, a method for extracting depth information by acquiring several images through video capturing, and a method for separately extracting objects included in one image based on the result of learning.

However, the method using the depth sensor or the stereo camera in the related art has the problem that it requires special hardware (e.g., depth sensor and two camera modules). Further, the depth sensor that uses infrared rays may not operate well outdoors. Further, since the depth sensor extracts a low-resolution depth map, it is difficult to apply the depth sensor to a high-resolution image.

Further, since the method for capturing a plurality of videos should capture the same scene for several seconds, it is inconvenient to use the method above. Further, the method above may fail to obtain the depth map if a moving object passes by during the capturing of the image.

Further, the method above for extracting objects based on the result of learning has the problem that it is insufficient in performance to cope with various environments and variables in capturing an actual image.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an imaging apparatus and a method for controlling the same, which can acquire a plurality of images through performing of continuous imaging in accordance with one user command and can perform out focusing using motion vectors and color images that are acquired through the plurality of images.

In accordance with an aspect of the present disclosure, a method for controlling an imaging apparatus is provided. The method includes acquiring a plurality of images having a same focal length by performing continuous imaging in a predetermined time when a user's imaging command is input, calculating a plurality of motion vectors using the plurality of images, separating a foreground and a background of a first image among the plurality of images based on the calculated plurality of motion vectors and color information of the first image, and performing out focusing based on the separated foreground and the separated background.

The separating of the foreground and the background of the first image may include recalculating the plurality of motion vectors using the plurality of images, detecting face information from the first image, constructing a first tri-mask through an estimation of an upper body based on the detected face information, correcting the first tri-mask based on the color information of the first image, and generating a first mask for separating the foreground and the background of the first image using the recalculated plurality of motion vectors, the color information of the first image, and the corrected first tri-mask.

The correcting of the first tri-mask based on the color information of the first image may include generating a probability model through learning of color information of the foreground and the background of the first image, and correcting a location of a shoulder mask of the first tri-mask based on the generated probability model.

The method according to an aspect of the present disclosure may further include obtaining a plurality of super pixels using the plurality of motion vectors, acquiring a plurality of clusters of pixels included in the first image using the plurality of super pixels, constructing a second mask using a plurality of clusters of an upper body region among the acquired plurality of clusters of pixels, and generating a second tri-mask using the first mask and the second mask.

The generating the second tri-mask may include generating of the second tri-mask includes generating a third mask through addition of the first mask and the second mask to each other, determining a result of erosion of the third mask as a foreground region, determining a region of the third mask as a foreground estimation region, determining a result of a dilation of the third mask as a background estimation region, and determining a remaining region as a background region to generate the second tri-mask.

A final mask may be acquired by repeatedly performing a graph-cut algorithm using the second tri-mask, the color information of the first image, and the plurality of motion vectors, and the separating of the foreground and the background may include separating the foreground and the background of the first image using the final mask.

The imaging apparatus may capture the plurality of images using a camera that does not provide an auto-focusing function.

In accordance with another aspect of the present disclosure, an imaging apparatus is provided. The apparatus includes an inputter configured to receive an input of a user's imaging command, an image capturer configured to capture a plurality of images, and at least one processor configured to acquire a plurality of images having a same focal length by performing continuous imaging in a predetermined time using the image capturer when the imaging command is input through the inputter, calculate a plurality of motion vectors using the plurality of images, separate a foreground and a background of a first image among the plurality of images based on the calculated plurality of motion vectors and color information of the first image, and perform out focusing based on the separated foreground and the separated background.

The at least one processor may further be configured to recalculate the plurality of motion vectors using the plurality of images, detect face information from the first image, construct a first tri-mask through estimation of an upper body based on the detected face information, correct the first tri-mask based on the color information of the first image, and generate a first mask for separating the foreground and the background of the first image using the recalculated plurality of motion vectors, the color information of the first image, and the corrected first tri-mask.

The at least one processor may further be configured to generate a probability model through a learning of color information of the foreground and the background of the first image, and correct a location of a shoulder mask of the first tri-mask based on the generated probability model.

The at least one processor may further be configured to obtain a plurality of super pixels using the plurality of motion vectors, acquire a plurality of clusters of pixels included in the first image using the plurality of super pixels, construct a second mask using a plurality of clusters of an upper body region among the acquired plurality of clusters of pixels, and generate a second tri-mask using the first mask and the second mask.

The at least one processor may further be configured to generate a third mask through addition of the first mask and the second mask to each other, determine a result of erosion of the third mask as a foreground region, determine a region of the third mask as a foreground estimation region, determine a result of a dilation of the third mask as a background estimation region, and determine a remaining region as a background region to generate the second tri-mask.

The at least one processor may further be configured to acquire a final mask by repeatedly performing a graph-cut algorithm using the second tri-mask, the color information of the first image, and the plurality of motion vectors, and separate the foreground and the background of the first image using the final mask.

The image capturer may further be configured to capture the plurality of images through a camera that does not provide an auto-focusing function.

As described above, according to various embodiments of the present disclosure, an out-focusing effect can be provided using a camera which is located on a front surface of an imaging apparatus and which does not have an auto-focusing function. Further, according to the present disclosure, special hardware is not required, the out-focusing effect can be provided with constant quality regardless of whether the imaging apparatus is indoors or outdoors, and the out focusing is performed through one imaging command input by a user to provide convenience in use.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
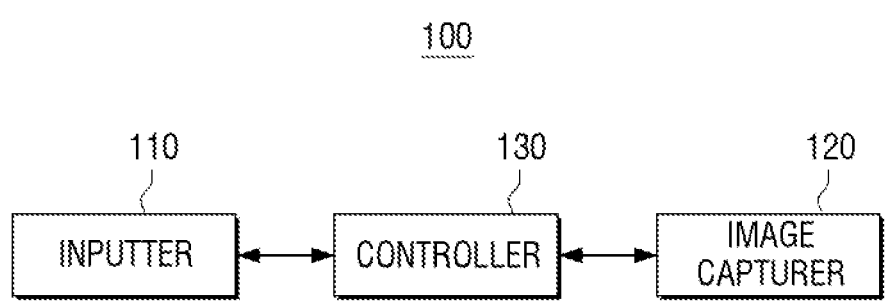
FIG. 1 is a block diagram schematically illustrating the configuration of an imaging apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understand of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms "first, second, and so forth" are used to describe diverse constituent elements, such constituent elements are not limited by the terms. The terms are used only to discriminate a constituent element from other constituent elements.

In the description, a singular expression may include a plural expression unless specially described. The term "includes" and/or "is composed of" used in the description means that one or more other components, operation and/or existence or addition of elements are not excluded in addition to the described components, operation and/or elements.

In embodiments of the present disclosure, the term "module" or "unit", as used herein, means, but is not limited to, software or hardware component or a combination thereof, which performs certain tasks. Further, "a plurality of modules or units" may be integrally formed as at least one module and may be implemented by at least one processor (not illustrated) except for "modules" or "units" that are required to be implemented by specific hardware.

In embodiments of the present disclosure, the term "connected to" or "coupled to" that is used to designate a connection or coupling of one constituent element to another constituent element includes both a case that a constituent element is "directly connected or coupled to" another constituent element and a case that a constituent element is connected or coupled to another constituent element via still another constituent element. In this case, the term "directly connected to" or "directly coupled to" means that a constituent element is connected or coupled to another constituent element without intervention of any other constituent element.

Hereinafter, preferred embodiments of the present disclosure will be described in detail with reference to the accompanying drawings. The aspects and features of the present disclosure and methods for achieving the aspects and features will be apparent by referring to the embodiments to be described in detail with reference to the accompanying drawings. However, the present disclosure may be implemented in various different forms, but is not limited to the embodiments described hereinafter. In the entire description of the present disclosure, the same drawing reference numerals are used for the same constituent elements across various figures.

FIG. 1 is a block diagram schematically illustrating the configuration of an imaging apparatus 100 according to an embodiment of the present disclosure.

Referring to FIG. 1, an imaging apparatus 100 includes an inputter 110, an image capturer 120, and a controller (at least one processor) 130. The imaging apparatus 100 according to an embodiment of the present disclosure may be implemented by a smart phone for example and is not limited thereto. The imaging apparatus 100 may be implemented by various imaging devices, such as a tablet personal computer (PC), a notebook PC, and a camera.

The inputter 110 receives an input of a user command from a user. In particular, the inputter 110 may receive an imaging command for capturing one or more images from the user.

The image capturer 120 captures images. In particular, if an imaging command is input through the inputter 110, the image capturer 120 may acquire a plurality of images having the same focal length through performing of continuous imaging in a predetermined time. On the other hand, the image capturer 120 may be a camera that does not provide an auto-focusing function, e.g., a camera that is located on the front surface of a smart phone.

The controller 130 controls the overall operation of the imaging apparatus 100. In particular, if the imaging command is input through the inputter 110, the controller 130 may acquire the plurality of images having the same focal length through performing of continuous imaging in the predetermined time using the image capturer 120, calculate depth information (i.e., motion vectors) using the plurality of images, separate a foreground and a background of a first image among the plurality of images based on the motion vectors and color information of the first image, and perform out focusing based on the separated foreground and background.

Specifically, if the plurality of images are acquired, the controller 130 may calculate the motion vectors using the plurality of images, detect face information from the first image, construct a first tri-mask through estimation of an upper body based on the face information, correct the first tri-mask based on the color information of the first image, and generate a first mask for separating the foreground and the background of the first image using the motion vectors, the color information of the first image, and the corrected first tri-mask. In this case, the controller 130 may generate a probability model through learning of color information of the foreground and background regions of the first image, and correct a location of a shoulder mask of the first tri-mask based on the probability model.

Further, the controller 130 may obtain super pixels using the motion vectors, acquire clusters of pixels included in the first image using the super pixels, construct a second mask using clusters of an upper body region among the acquired clusters, and acquire a second tri-mask using the first mask and the second mask. Specifically, the controller 130 may generate a third mask through addition of the first mask and the second mask to each other, determine a result of erosion of the third mask as a foreground region, determine a region of the third mask as a foreground estimation region, determine a result of dilation of the third mask as a background estimation region, and determine a remaining region as the background region to acquire the second tri-mask.

Further, the controller 130 may acquire a final mask by repeatedly performing a graph-cut algorithm using the acquired second tri-mask, the motion vectors, and the color information. Further, the controller 130 may separate the foreground and the background of the first image using the acquired final mask.

Figure 2:
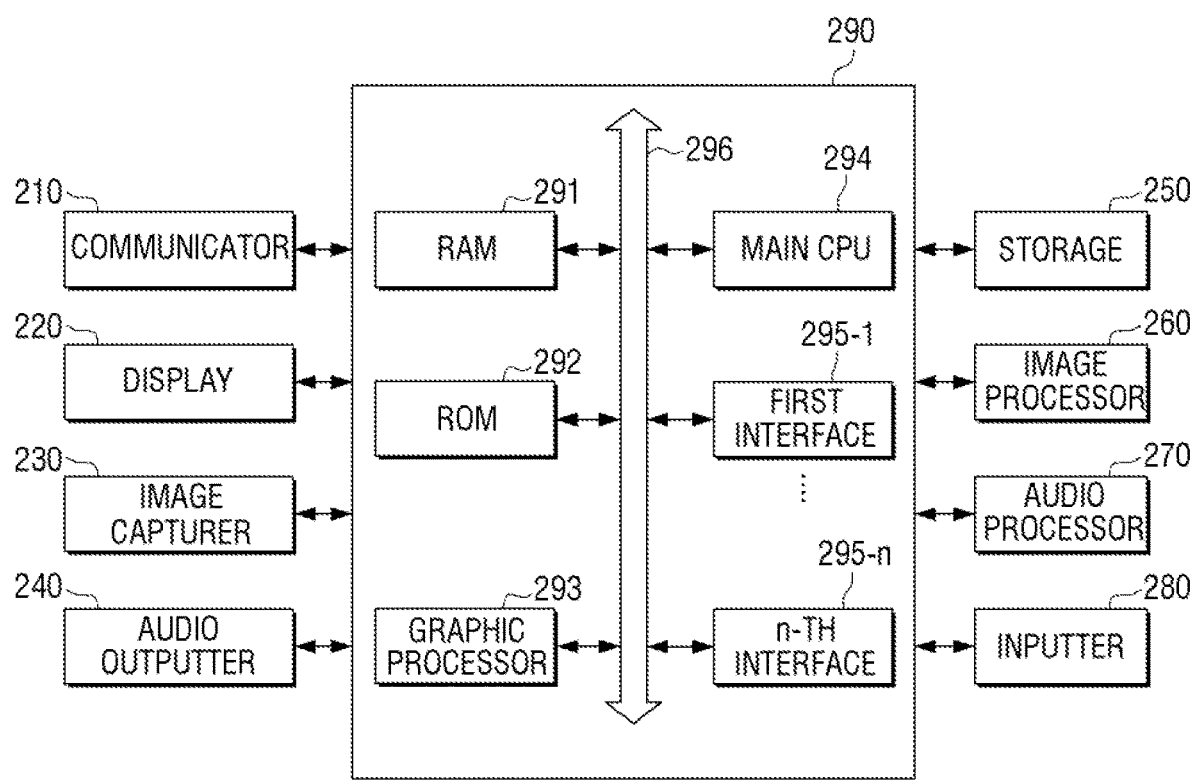
FIG. 2 is a block diagram illustrating the detailed configuration of an imaging apparatus according to an embodiment of the present disclosure.

FIG. 2 is a block diagram illustrating the detailed configuration of an imaging apparatus according to an embodiment of the present disclosure, and FIGS. 3, 4, 5, 6, 7, and 8 are diagrams explaining a method for an imaging apparatus to separate a foreground and a background in an image according to various embodiments of the present disclosure.

Hereinafter, referring to FIGS. 2, 3, 4, 5, 6, 7, and 8, the present disclosure will be described in greater detail.

Referring to FIG. 2, an imaging apparatus 200 includes a communicator 210, a display 220, an image capturer 230, an audio outputter 240, a storage 250, an image processor 260, an audio processor 270, an inputter 280, and a controller 290.

FIG. 2 synthetically illustrates various kinds of constituent elements, for example, in the case where the imaging apparatus 200 is an apparatus having various functions, such as an imaging function, an auto-focusing function, and a display function. Thus, according to various embodiments of the present disclosure, the constituent elements as illustrated in FIG. 2 may be partially omitted or changed, and/or other constituent elements may be further added.

The communicator 210 is configured to perform communication with various types of external devices or an external server in accordance with various types of communication methods. The communicator 210 may include various communication chips, such as a Wireless Fidelity (Wi-Fi) chip, a Bluetooth (BT) chip, a near field communication (NFC) chip, and a wireless communication chip. In this case, the Wi-Fi chip, the BT chip, and the NFC chip perform communication in Wi-Fi, BT, and NFC methods, respectively. Among them, the NFC chip refers to a chip that operates an NFC method using 13.56 MHz band among various radio frequency identification (RF-ID) frequency bands, such as 135 kHz, 13.56 MHz, 433 MHz, 860-960 MHz, and 2.45 GHz. In the case of using the Wi-Fi chip or the BT chip, various kinds of connection information, such as service set identifier (SSID) and session keys, may be first transmitted and received, and using this, various kinds of information may be transmitted and received after the communication connection. The wireless communication chip refers to a chip that performs communication according to various communication standards, such as IEEE, ZigBee, $3^{rd}$ generation (3G), $3^{rd}$ Generation Partnership Project (3GPP), and long term evolution (LTE).

In particular, the communicator 210 may transmit and receive data with an external terminal, or may perform video call.

The display 220 displays at least one of video frames obtained by processing received video data through the image processor 260 and various scenes generated by a graphic processor 293. Further, the display 220 may display an image that is acquired through the image capturer 230 as a live view.

The image capturer 230 captures an image of an external object. In particular, the image capturer 230 may include a plurality of camera modules. In this case, the image capturer 230 may include a camera module that does not provide an auto-focusing function among the plurality of camera modules. Further, the image capturer 230 may provide a continuous imaging function that can acquire a plurality of images within a predetermined time.

The audio outputter 240 is configured to output not only various kinds of audio data processed by the audio processor 270 but also various kinds of notification sound or voice message.

The storage 250 stores therein various modules for driving the imaging apparatus 200. For example, the storage 250 may store therein software that includes a base module, a sensing module, a communication module, a presentation module, a web browser module, and a service module. In this case, the base module is a basic module which processes signals that are transferred from respective pieces of hardware included in the imaging apparatus 200 and transfers the processed signals to an upper layer module. The sensing module is a module which collects information from various kinds of sensors and analyzes and manages the collected information, and may include a face recognition module, a voice recognition module, a motion recognition module, and an NFC recognition module. The presentation module is a module for constructing a display screen, and may include a multimedia module for reproducing and outputting multimedia content and a UI rendering module for performing user interface (UI) and graphic processes. The communication module is a module for performing communication with an outside. The web browser module refers to a module for accessing a web server through performing of web browsing. The service module is a module that includes various kinds of applications for providing various services.

Further, the storage 250 may include a volatile storage medium for temporarily storing a live view image that is acquired through the image capturer 230 and a nonvolatile storage medium for storing an image that is acquired in accordance with a user's imaging command.

The image processor 260 is a constituent element that processes video data received in an image receiver. The image processor may perform various image processing operations, such as video data decoding, scaling, noise filtering, frame rate conversion, and resolution conversion. Further, the image processor 260 may process an image that is captured through the image capturer 230.

The audio processor 270 is a constituent element that processes audio data. The audio processor 270 may perform various audio processing operations, such as audio data decoding, amplification, and noise filtering. The audio data that is processed by the audio processor 270 may be output to the audio outputter 240.

The inputter 280 receives a user command for controlling the overall operation of the imaging apparatus 200. In particular, the inputter 280 may receive an input of the user's capturing command.

On the other hand, the inputter 280 may be implemented by a touch panel as an example and is not limited thereto. The inputter 280 may also be implemented by other input devices that can control the imaging apparatus 200, such as a remote controller, a pointing device, a mouse, a keyboard, and a shutter button.

The controller 290 may control the overall operation of the imaging apparatus 200 using various kinds of programs stored in the storage 250.

As illustrated in FIG. 2, the controller 290 includes a random access memory (RAM) 291, a read only memory (ROM) 292, a graphic processor 293, a main central processing unit (CPU) 294, first to n-th interfaces 295-1 to 295-$n$, and a bus 296. In this case, the RAM 291, the ROM 292, the graphic processor 293, the main CPU 294, and the first to n-th interfaces 295-1 to 295-$n$ may be connected to one another through the bus 296.

In the ROM 292, a command set for system booting is stored. If a turn-on command is input and a power is supplied, the main CPU 294 copies the operating system (OS) stored in the storage 250 into the RAM 291 according to the command stored in the ROM 292, and boots the system through execution of the OS. If the booting is completed, the main CPU 294 copies various kinds of application programs stored in the storage 250 into the RAM 291, and perform various operations through execution of the application programs copied into the RAM 291.

Referring to FIG. 2, the graphic processor 293 generates a screen that includes various objects, such as icons, images, and texts, using an operator (not illustrated) and a renderer (not illustrated). The operator operates attribute values, such as coordinate values, shapes, sizes, and colors of the respective objects to be displayed, in accordance with the layout of the screen using a control command that is received from the inputter 130. The renderer generates a screen of various layouts including the objects on the basis of the attribute values operated by the operator. The screen that is generated by the renderer is displayed within a display region of the display 220.

The main CPU 294 accesses the storage 250, and performs booting using the OS stored in the storage 250. Further, the main CPU 294 performs various operations using various kinds of programs, content, and data that are stored in the storage 250.

The first to n-th interfaces 295-1 to 295-$n$ are connected to the various kinds of constituent elements as described above. One of the interfaces may be a network interface that is connected to an external device through a network.

In particular, if an imaging command is input through the inputter 280, the controller 290 acquires a plurality of images having the same focal length through performing of continuous imaging within a predetermined time using the image capturer 230, calculates motion vectors using the plurality of images, separates a foreground and a background of a first image among the plurality of images based on the motion vectors and color information of the first image, and performs out focusing based on the separated foreground and background. In this case, the motion vector is information about x-axis motion and y-axis motion of a pixel, and thus may be two-dimensional (2D) information. Further, the color information is red green blue (RGB) information of the video data, and thus may be three-dimensional (3D) information.

Specifically, if the imaging command is input, the controller 290 may control the image capturer 230 to perform continuous imaging through a camera provided on the front surface of the imaging apparatus 200. In this case, the camera that is provided on the front surface of the imaging apparatus 200 is a camera for a user to perform self-imaging, and may be a camera that has no auto-focusing function.

Figure 3:
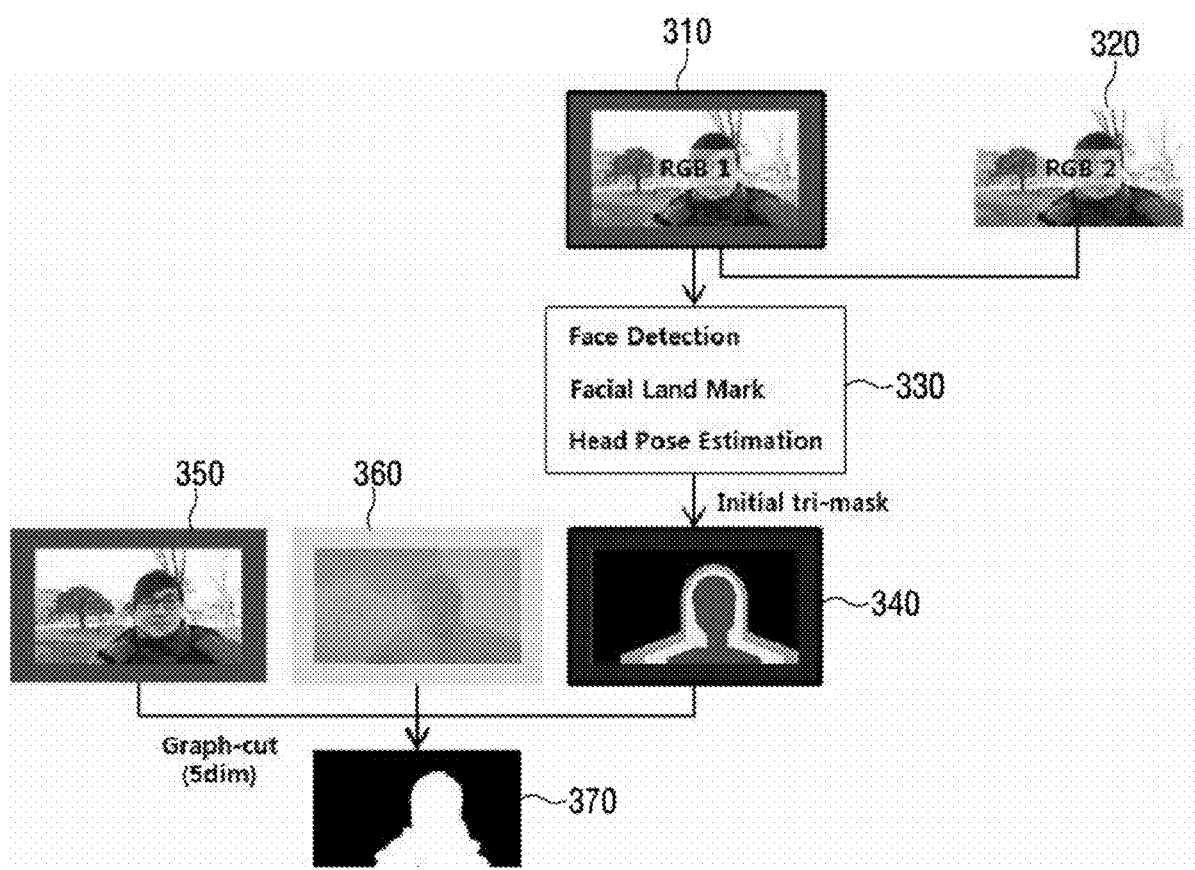
FIGS. 3, 4, 5, 6, 7, and 8 are diagrams explaining a method for an imaging apparatus to separate a foreground and a background in an image according to various embodiments of the present disclosure.

The controller 290 (shown in FIG. 2) may acquire a first image 310 and a second image 320 as shown in FIG. 3 through the continuous imaging.

Figure 4:
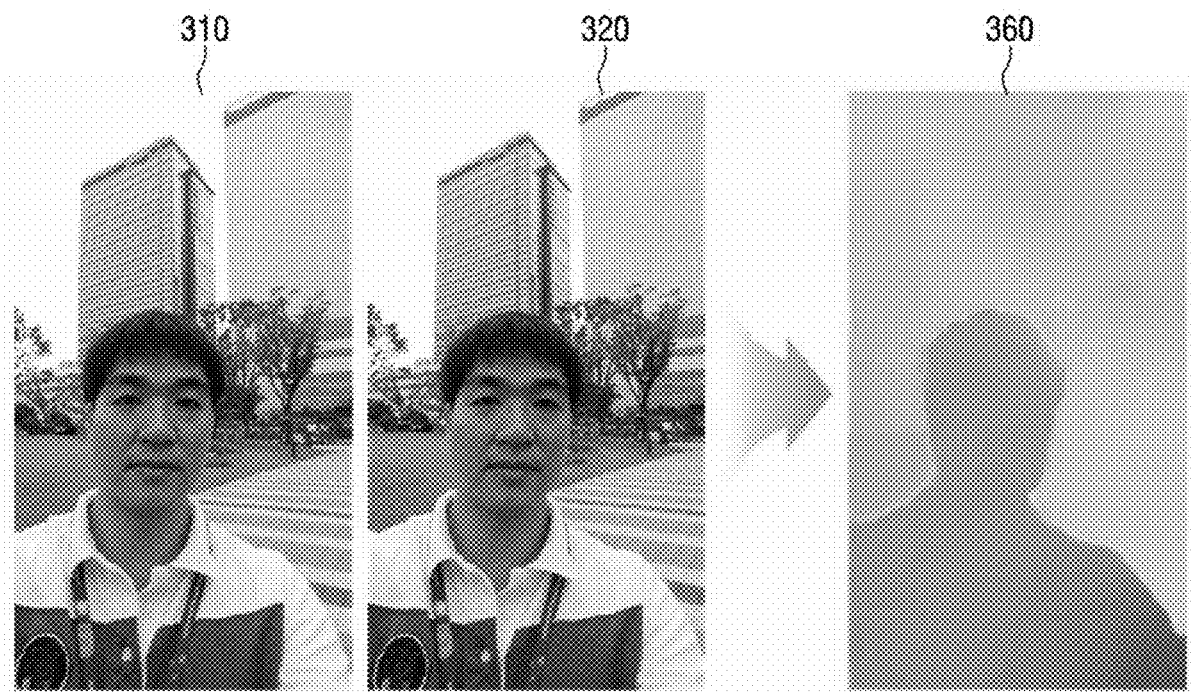

Further, the controller 290 may calculate motion vectors using a plurality of images. Specifically, even if the continuous imaging is performed, camera movement may occur due to hand trembling of a user, and pixel movement may occur between two images due to the camera movement. Accordingly, as shown in FIG. 4, the controller 290 may calculate the motion vectors based on the pixel movement between the first image 310 and the second image 320. In an embodiment of the present disclosure, the controller 290 may calculate the motion vectors 360 through an optical flow algorithm. In this case, as shown in FIG. 4, the motion vectors 360 may be depth map type information.

Further, the controller 290 may acquire user's face information included in the first image. Specifically, the controller 290 may acquire the face information by performing face detection from the first image 310 and facial land mark and head pose estimation 330. Further, the controller 290 may estimate a human upper body region based on the face information and construct a first tri-mask 340 based on the estimated upper body region. In this case, since a shoulder portion of the first tri-mask 340 is obtained using only face location and pose information, an error may occur. In this case, in order to correct the error, the controller 290 may generate a probability model through a learning of color information of the first image 310 and correct the mask location of the shoulder portion of the first tri-mask 340 based on the probability model Further, as shown in FIG. 3, the controller 290 may acquire a first mask 370 by performing a graph-cut algorithm based on the color information 350 of the first image, the motion vectors 360, and the first tri-mask 370. In this case, the mask may be information that is used to separate a foreground and a background of the image.

Figure 5:
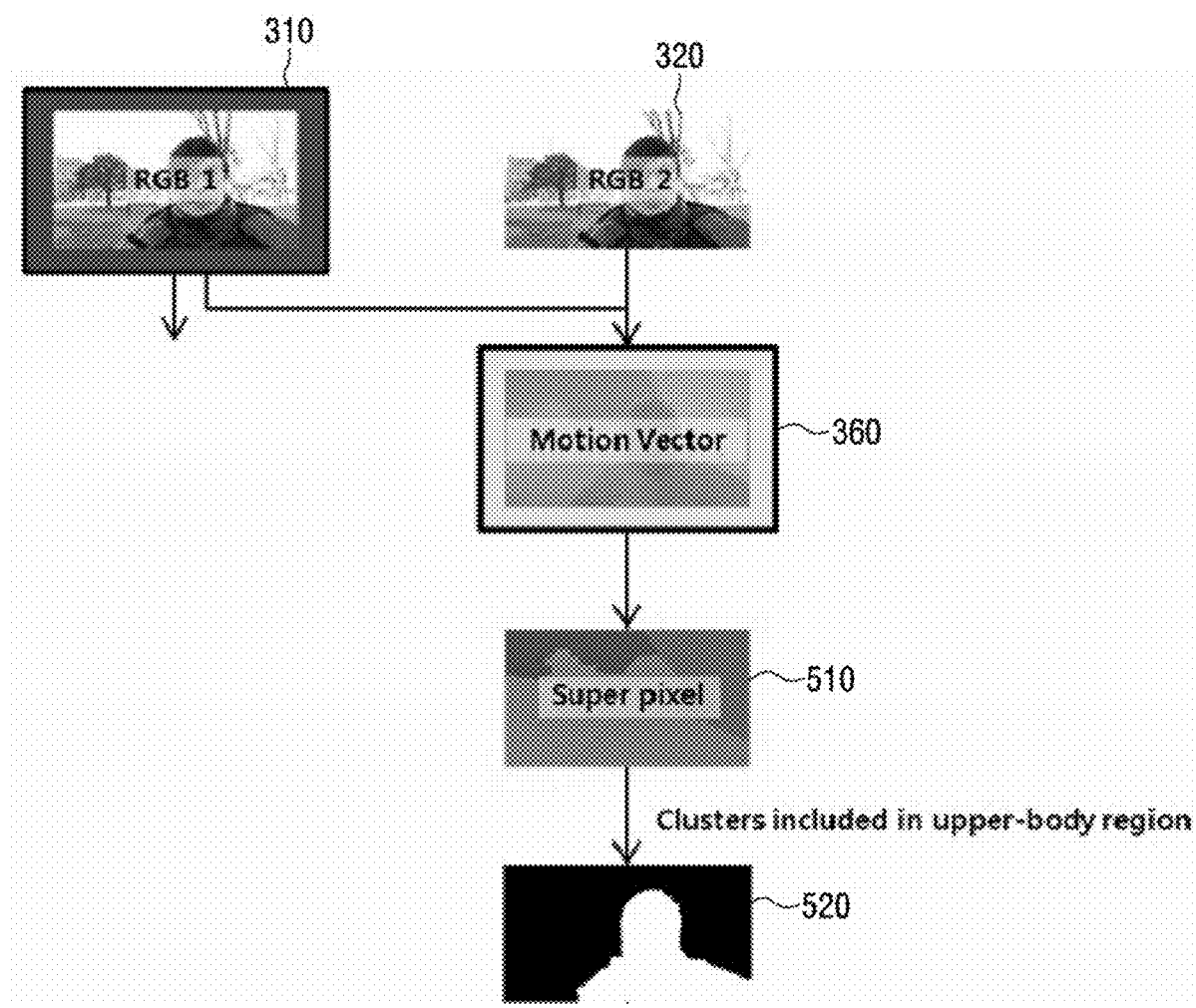

Referring to FIG. 5, the controller 290 may acquire clusters of pixels included in the first image 310 by obtaining super pixels 510 using the motion vectors 360 that are acquired through the first image 310 and the second image 320. Further, the controller 290 may construct a second mask 520 using clusters of an upper body region among the acquired clusters. That is, the existing first mask 370 has no information (e.g., hairstyle and type of clothes), from which the upper body can be estimated, except the face information. Accordingly, more accurate foreground/background separation becomes possible through acquisition of the information, from which the upper body can be estimated, except the face information using the second mask 520 that is acquired through the clusters of the upper body region.

Further, the controller 290 may repeatedly update the masks using the first mask 370, the second mask 520, the color information 350, and the motion vectors 360.

Figure 6:
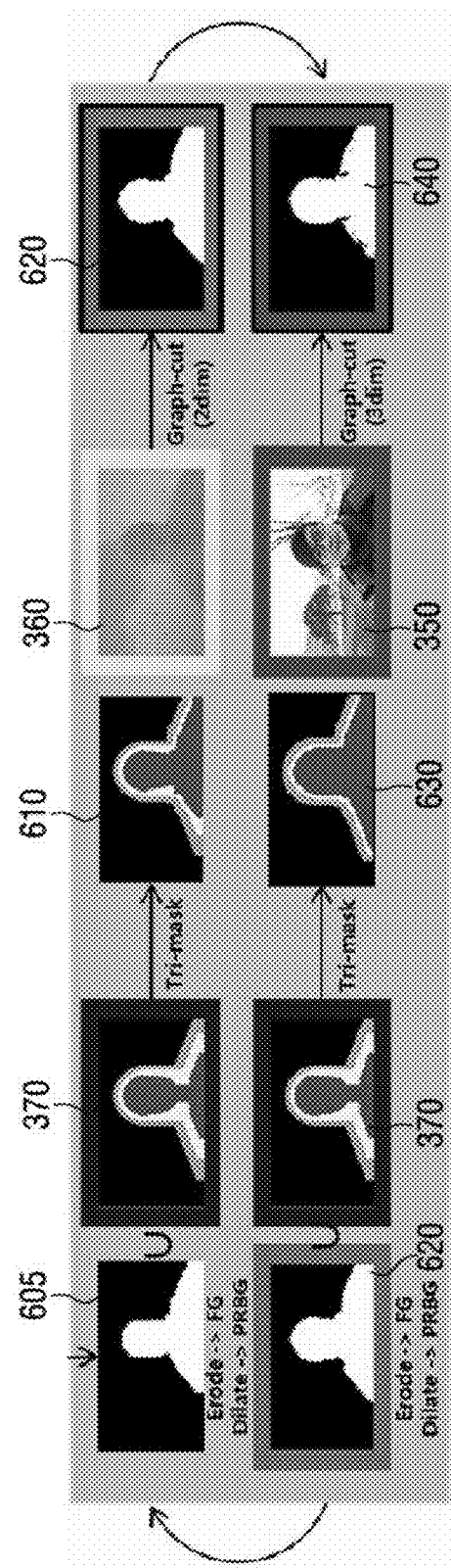

Specifically, the controller 290 may acquire a third mask 605 through addition of the first mask 370 and the second mask 520 to each other. Further, with reference to FIG. 6, the controller 290 may generate a second tri-mask 610 through the third mask 605. More specifically, the controller 290 may generate the second tri-mask 610 by determining the result of erosion of the third mask 605 as the foreground region, determining a region of the third mask 605 as a foreground estimation region, determining the result of dilation of the third mask 605 as a background estimation region, and determining the remaining region as the background region. In this case, in order to prevent the foreground estimation region and the background estimation region from being unexpectedly expanded or contracted, as shown in FIG. 6, the controller 290 may generate the second tri-mask 610 using the first tri-mask 370.

Further, the controller 290 may acquire a fourth mask 620 through performing of a graph-cut algorithm using the second tri-mask 610 and the motion vector 360.

Further, the controller 290 may acquire a third tri-mask 630 using the fourth mask 620. In this case, in the same manner as described above, the controller 290 may acquire the third tri-mask 630 by determining the result of erosion of the fourth mask 620 as the foreground region, determining a region of the fourth mask 620 as the foreground estimation region, determining the result of dilation of the fourth mask 620 as the background estimation region, and determining the remaining region as the background region. In this case, in order to prevent the foreground estimation region and the background estimation region from being unexpectedly expanded or contracted, as shown in FIG. 6, the controller 290 may also generate the third tri-mask 630 using the first tri-mask 370.

Further, the controller 290 may acquire a fifth mask 640 through performing of the graph-cut algorithm using the third tri-mask 630 and the color information 350.

In particular, the controller 290 can perform more accurate segmentation by repeatedly updating the masks for separating the foreground and the background using the color information 350 and the motion vectors 360. In particular, through performing of the graph-cut algorithm using the motion vectors 360, the masks can be expanded or contracted to coincide with the upper body region, and through performing of the graph-cut algorithm using the color information 350, more accurate segmentation becomes possible in a corner region.

Figure 7:
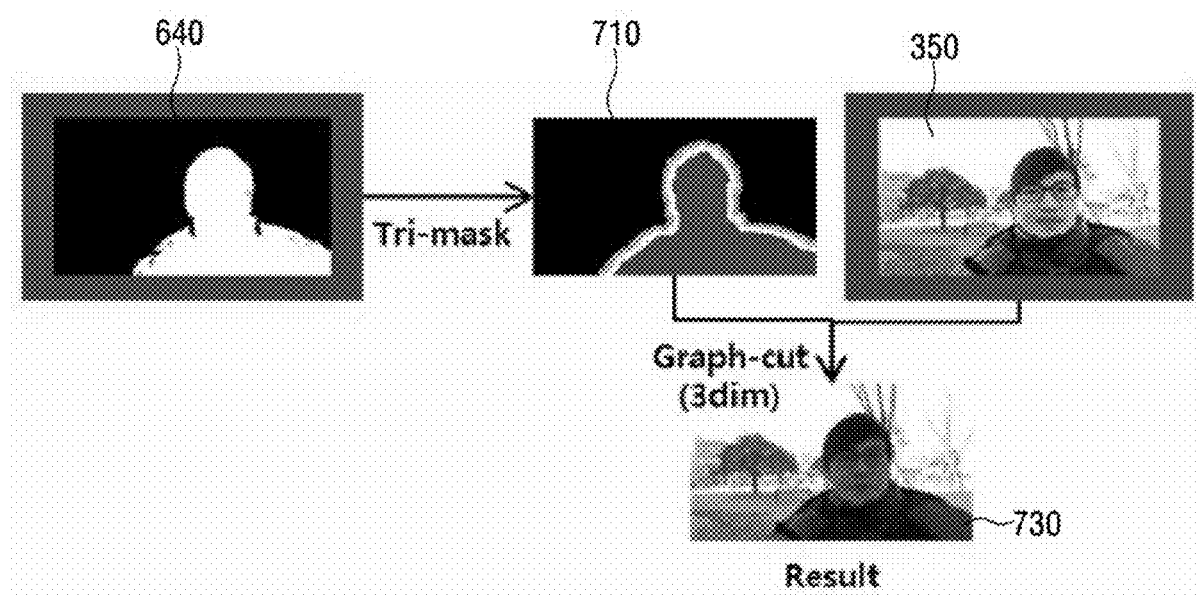

On the other hand, as an example, in the above-described embodiment, the masks are updated twice using the color information 350 and the motion vectors 360, and therefore are not limited thereto. The masks may be updated three times or more. However, in order to perform more accurate segmentation in the corner region, the controller 290 may perform the segmentation using the color information 350. That is, as illustrated in FIG. 7, the controller 290 may generate a final mask through the graph-cut algorithm using the fourth tri-mask 710 that is generated using the fifth mask 640 and the color information 350, and acquire the result of segmentation 730 in which the foreground and the background are separated using the final mask.

Figure 8:
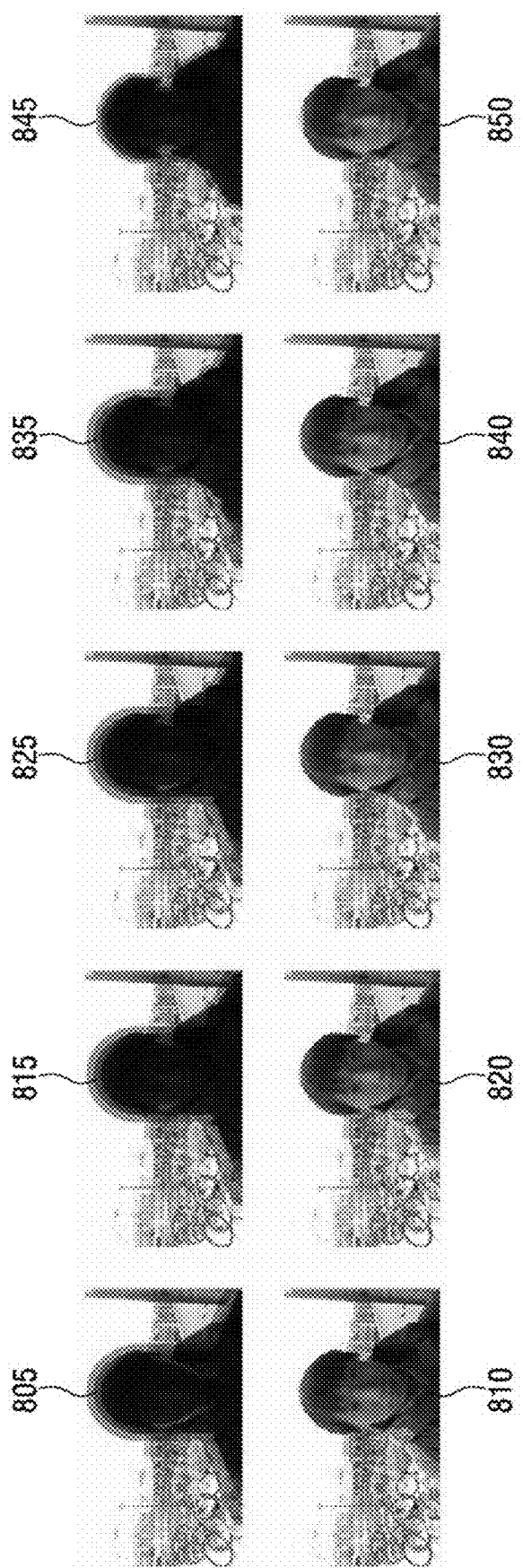

As described above, the controller 290 can perform more accurate segmentation by repeatedly updating (or recalculating) the masks for separating the foreground and the background. Referring to FIG. 8, in consideration of a first tri-mask 805 once updated, a second tri-mask 815 updated twice, a third tri-mask 825 updated three times, a fourth tri-mask 835 updated four times, and a fifth tri-mask 845 updated five times, it can be confirmed that the tri-mask gradually approaches the foreground through repeatedly performing the update. Through this, in consideration of the first segmentation result 810 by the first tri-mask 805, the second segmentation result 820 by the second tri-mask 815, the third segmentation result 830 by the third tri-mask 825, the fourth segmentation result 840 by the fourth tri-mask 835, and the fifth segmentation result 850 by the fifth tri-mask 845, it can be confirmed that the foreground and background regions are separated more accurately through repeatedly performing the mask update.

Further, the controller 290 may perform out focusing based on the foreground and background regions that are separated in the above-described method. That is, the controller 290 may provide the out-focusing effect through blurring of a region that is determined as the background region.

Figure 9:
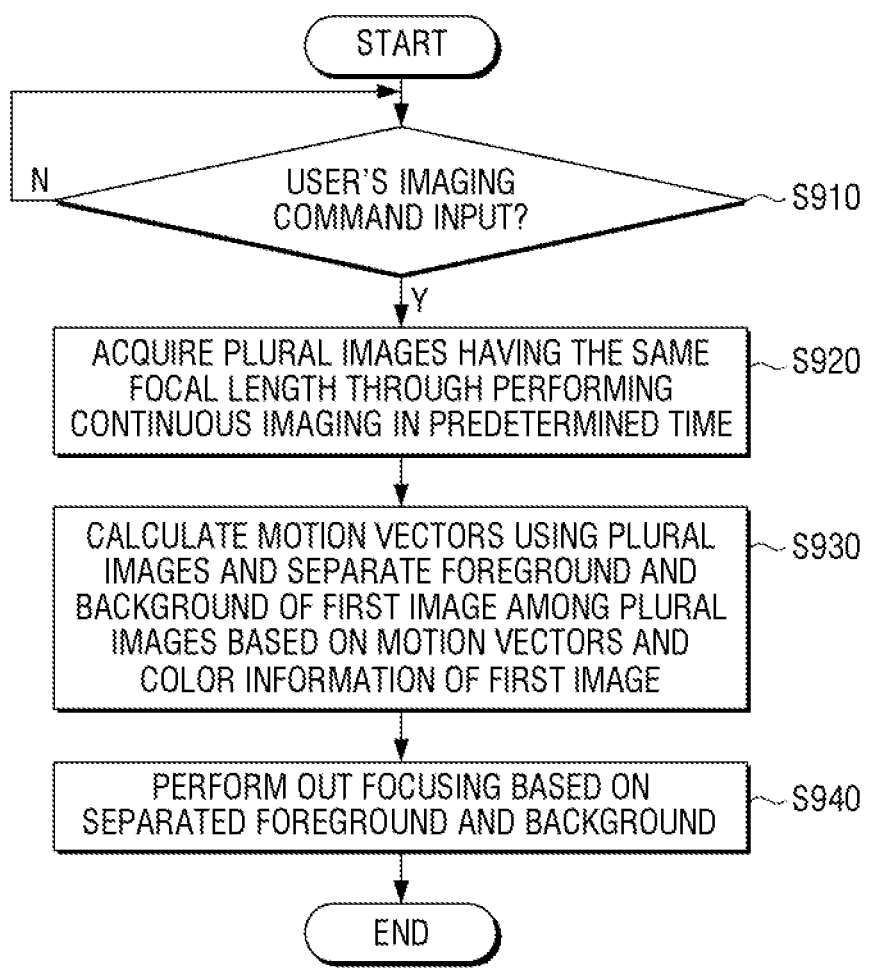
FIG. 9 is a flowchart explaining a method for controlling an imaging apparatus according to an embodiment of the present disclosure.

FIG. 9 is a flowchart explaining a method for controlling an imaging apparatus according to an embodiment of the present disclosure.

Referring to FIG. 9, the imaging apparatus 100 (e.g., the imaging apparatus 200) determines whether a user's imaging command is input at operation S910. In this case, the imaging apparatus 100 may receive an input of an imaging command for self-imaging.

If the imaging command is input at operation S910, the imaging apparatus acquires a plurality of images having the same focal length through performing of continuous imaging within a predetermined time at operation S920. In this case, the imaging apparatus 100 may acquire the plurality of images through a camera (e.g., the front camera of a smart phone) that has no auto-focusing function.

The imaging apparatus 100 calculates motion vectors using the plurality of images, and separates a foreground and a background of a first image among the plurality of images based on the motion vectors and color information of the first image at operation S930. Specifically, as described above with reference to FIGS. 3, 4, 5, 6, 7, and 8, the imaging apparatus 100 repeatedly updates (or recalculates) masks for separating the foreground and the background based on the motion vectors (i.e., depth information) and color information, and thus can perform more accurate segmentation.

Further, the imaging apparatus 100 performs out focusing based on the separated foreground and background at operation S940.

As described above, according to various embodiments of the present disclosure, the out-focusing effect can be provided using the camera which is located on the front surface of the imaging apparatus and which does not have the auto-focusing function. Further, according to the present disclosure, special hardware is not required, the out-focusing effect can be provided with constant quality regardless of whether the imaging apparatus is indoors or outdoors, and the out focusing is performed through one imaging command input by the user to provide convenience in use.

On the other hand, the method for controlling an imaging apparatus according to the various embodiments as described above may be implemented by a program and may be provided to a display device or an input device. In particular, the program including the method for controlling the imaging apparatus may be stored in a non-transitory computer readable medium to be provided.

The non-transitory computer readable medium is not a medium that stores data for a short period, such as a register, a cache, or a memory, but refers to a medium which semi-permanently stores data and is readable by a device. Specifically, various applications and programs as described above may be stored and provided in the non-transitory computer readable medium, such as, a compact disc (CD), a digital versatile disc (DVD), a hard disc, a Blu-ray disc, a universal serial bus (USB), a memory card, and a ROM.

While the disclosure has been shown and described with reference to various embodiments thereof, it will be understood by those skilled in the art that various changes in form and details may be made therein without departing from the spirit and scope of the disclosure, as defined by the appended claims and their equivalents.

What is claimed is:

1. A method for controlling an imaging apparatus, the method comprising:
   acquiring, through a camera, a plurality of images having a same focal length by performing continuous imaging in a predetermined time in response to a user's imaging command being input;
   obtaining first information for a face detection based on a first image among the plurality of images;
   obtaining second information for facial landmarks based on the first image;
   identifying a face of the user based on the first information for the face detection and the second information for the facial landmarks;
   identifying a portion of a user's body based on the identified face of the user and color information of the first image;
   obtaining a plurality of motion vectors based on the plurality of images;
   separating a foreground and a background of the first image based on the first information for the face detection, the second information for the facial landmarks, the color information of the first image, and the plurality of motion vectors, the foreground including the identified face of the user and the identified portion of the user's body; and
   performing out focusing of the separated background.

2. The method as claimed in claim 1, further comprising:
   acquiring at least one image with the first image by performing the continuous imaging in the predetermined time in response to the user's imaging command being input, the at least one image having the same focal length as the first image; and
   obtaining the plurality of motion vectors based on the first image and the at least one image.

3. The method as claimed in claim 2, further comprising:
   obtaining a first mask for separating the foreground and the background of the first image based on the first information, the second information, the color information of the first image, and the plurality of motion vectors; and
   separating the foreground and the background of the first image based on the first mask, the first information, the second information, the color information of the first image, and the plurality of motion vectors.

4. The method as claimed in claim 3, wherein the separating of the foreground and the background of the first image comprises:
   obtaining a first tri-mask through an estimation of an upper body based on the first information and the second information;
   correcting the first tri-mask based on the color information of the first image; and
   obtaining the first mask for separating the foreground and the background of the first image based on the plurality of motion vectors, the color information of the first image, and the first tri-mask.

5. The method as claimed in claim 4, further comprising:
   obtaining a plurality of super pixels based on the plurality of motion vectors;
   obtaining a plurality of clusters of pixels included in the first image based on the plurality of super pixels;

obtaining a second mask based on a plurality of clusters of an upper body region among the obtained plurality of clusters of pixels; and obtaining a second tri-mask based on the first mask and the second mask.

6. The method as claimed in claim 5, wherein the obtaining of the second tri-mask comprises:

obtaining a third mask through addition of the first mask and the second mask to each other;

determining a result of erosion of the third mask as a foreground region;

determining a region of the third mask as a foreground estimation region;

determining a result of a dilation of the third mask as a background estimation region; and determining a remaining region as a background region to obtain the second tri-mask.

7. The method as claimed in claim 6, further comprising:

obtaining a final mask by repeatedly performing a graph-cut algorithm based on the second tri-mask, the color information of the first image, and the plurality of motion vectors, wherein the separating of the foreground and the background comprises separating the foreground and the background of the first image based on the final mask.

8. The method as claimed in claim 1, further comprising:

obtaining third information for head pose estimation based on the first image; and separating the foreground and the background of the first image based on the first information for the face detection, the second information for the facial landmarks, and the third information for head pose estimation.

9. An imaging apparatus comprising:

a user interface (UI);

a camera; and at least one processor configured to:

acquire, through the camera, a plurality of images having a same focal length by performing continuous imaging in a predetermined time in response to a user's imaging command being input through the UI, obtain first information for a face detection based on a first image among the plurality of images, obtain second information for facial landmarks based on the acquired first image, identify a face of the user based on the first information for the face detection and the second information for the facial landmarks, identify a portion of a user's body based on the identified face of the user and color information of the first image, obtain a plurality of motion vectors based on the plurality of images, separate a foreground and a background of the first image based on the first information for the face detection, the second information for the facial landmarks, the color information of the first image, and the plurality of motion vectors, the foreground including the identified face of the user and the identified portion of the user's body, and perform out focusing of the separated background.

10. The imaging apparatus as claimed in claim 9, wherein the at least one processor is further configured to:

acquire at least one image with the first image by performing the continuous imaging in the predetermined time in response to the user's imaging command being input, the at least one image having the same focal length as the first image; and obtain the plurality of motion vectors based on the first image and the at least one image.

11. The imaging apparatus as claimed in claim 10, wherein the at least one processor is further configured to:

obtain a first mask for separating the foreground and the background of the first image based on the first information, the second information, the color information of the first image, and the plurality of motion vectors; and separate the foreground and the background of the first image based on the first mask, the first information, the second information, the color information of the first image, and the plurality of motion vectors.

12. The imaging apparatus as claimed in claim 11, wherein the at least one processor is further configured to:

obtain a first tri-mask through an estimation of an upper body based on the first information and the second information;

correct the first tri-mask based on the color information of the first image; and obtain the first mask for separating the foreground and the background of the first image based on the plurality of motion vectors, the color information of the first image, and the first tri-mask.

13. The imaging apparatus as claimed in claim 12, wherein the at least one processor is further configured to:

obtain a plurality of super pixels based on the plurality of motion vectors;

obtain a plurality of clusters of pixels included in the first image based on the plurality of super pixels;

obtain a second mask based on a plurality of clusters of an upper body region among the obtained plurality of clusters of pixels; and obtain a second tri-mask based on the first mask and the second mask.

14. The imaging apparatus as claimed in claim 13, wherein the at least one processor is further configured to:

obtain a third mask through addition of the first mask and the second mask to each other;

determine a result of erosion of the third mask as a foreground region;

determine a region of the third mask as a foreground estimation region;

determine a result of a dilation of the third mask as a background estimation region; and determine a remaining region as a background region to obtain the second tri-mask.

15. The imaging apparatus as claimed in claim 14, wherein the at least one processor is further configured to:

obtain a final mask by repeatedly performing a graph-cut algorithm based on the second tri-mask, the color information of the first image, and the plurality of motion vectors; and separate the foreground and the background of the first image based on the final mask.

16. The imaging apparatus as claimed in claim 9, wherein the at least one processor is further configured to:

obtain third information for head pose estimation based on the first image; and separate the foreground and the background of the first image based on the first information for the face detection, the second information for the facial landmarks, and the third information for head pose estimation.

* * * * *